(12) United States Patent
Sim

(10) Patent No.: US 12,319,254 B2
(45) Date of Patent: Jun. 3, 2025

(54) ACTUATOR FOR BRAKE DEVICE

(71) Applicant: HL MANDO CORPORATION, Pyeongtaek-si (KR)

(72) Inventor: Chanyoung Sim, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 446 days.

(21) Appl. No.: 17/776,061

(22) PCT Filed: Nov. 3, 2020

(86) PCT No.: PCT/KR2020/015241
§ 371 (c)(1),
(2) Date: May 11, 2022

(87) PCT Pub. No.: WO2021/096147
PCT Pub. Date: May 20, 2021

(65) Prior Publication Data
US 2022/0379866 A1 Dec. 1, 2022

(30) Foreign Application Priority Data

Nov. 12, 2019 (KR) .......................... 10-2019-0144019

(51) Int. Cl.
*B60T 13/74* (2006.01)
*F16D 65/16* (2006.01)
(Continued)

(52) U.S. Cl.
CPC ............ *B60T 13/746* (2013.01); *F16D 65/16* (2013.01); *F16D 2121/24* (2013.01); *F16D 2125/50* (2013.01); *F16D 2125/52* (2013.01)

(58) Field of Classification Search
CPC ...... B60T 13/74; B60T 13/741; B60T 13/746; H02K 7/116; F16H 1/04; F16H 1/28;
(Continued)

(56) References Cited

U.S. PATENT DOCUMENTS 6,814,190 B1* 11/2004 Olschewski ............ F16H 25/22
188/162
2013/0270047 A1 10/2013 Kim
(Continued)

FOREIGN PATENT DOCUMENTS

CN 204921930 U 12/2015
CN 108263357 A 7/2018
(Continued)

OTHER PUBLICATIONS

International Search Report (PCT/ISA/210) issued in PCT Application No. PCT/KR2020/015241 dated Feb. 24, 2021 with English Translation.
(Continued)

*Primary Examiner* — Robert A. Siconolfi
*Assistant Examiner* — San M Aung
(74) *Attorney, Agent, or Firm* — Harvest IP Law, LLP

(57) ABSTRACT

Disclosed is an actuator for a brake device. In accordance with an aspect of the disclosure an actuator for a brake device includes a motor; a first reduction gear unit connected to the motor; and a second reduction gear unit connected to the first reduction gear unit; wherein the first reduction gear unit is provided as a planetary gear assembly, and the second reduction gear unit is provided as a bevel gear assembly.

12 Claims, 8 Drawing Sheets

(51) Int. Cl.
  *F16D 121/24* (2012.01)
  *F16D 125/50* (2012.01)
  *F16D 125/52* (2012.01)

(58) Field of Classification Search
  CPC ...... F16H 57/00; F16H 57/021; F16H 57/022; F16H 57/038; F16D 65/0006; F16D 65/16; F16D 65/18; F16D 2121/24; F16D 2125/40; F16D 2125/50; F16D 2125/52; F16D 2131/00
  USPC .................................................. 188/156
  See application file for complete search history.

(56) References Cited

U.S. PATENT DOCUMENTS

| | | | |
|---|---|---|---|
| 2014/0034432 A1* | 2/2014 | Bull | B60T 13/741 188/106 R |
| 2017/0219036 A1* | 8/2017 | Song | F16D 65/0075 |
| 2018/0238408 A1* | 8/2018 | Song | F16D 65/18 |
| 2019/0063527 A1* | 2/2019 | Thomas | F16D 65/14 |

FOREIGN PATENT DOCUMENTS

| | | |
|---|---|---|
| CN | 110329234 A | 10/2019 |
| CN | 209634462 U | 11/2019 |
| JP | 2018-17300 A | 2/2018 |
| KR | 10-0666724 B1 | 1/2007 |
| KR | 10-2011-0072877 A | 6/2011 |
| KR | 10-1321719 B1 | 10/2013 |
| KR | 10-1600928 B1 | 3/2016 |
| KR | 10-1688878 B1 | 12/2016 |
| KR | 10-2018-0076849 A | 7/2018 |
| KR | 10-2019-0078062 A | 7/2019 |

OTHER PUBLICATIONS

Written Opinion (PCT/ISA/237) issued in PCT Application No. PCT/KR2020/015241 dated Feb. 24, 2021.
Office Action issued Sep. 19, 2023 for counterpart Chinese Patent Application No. 202080078705.9.
Office Action issued Aug. 3, 2023 for counterpart German Patent Application No. 112020005592.2.

* cited by examiner

【FIG. 1】
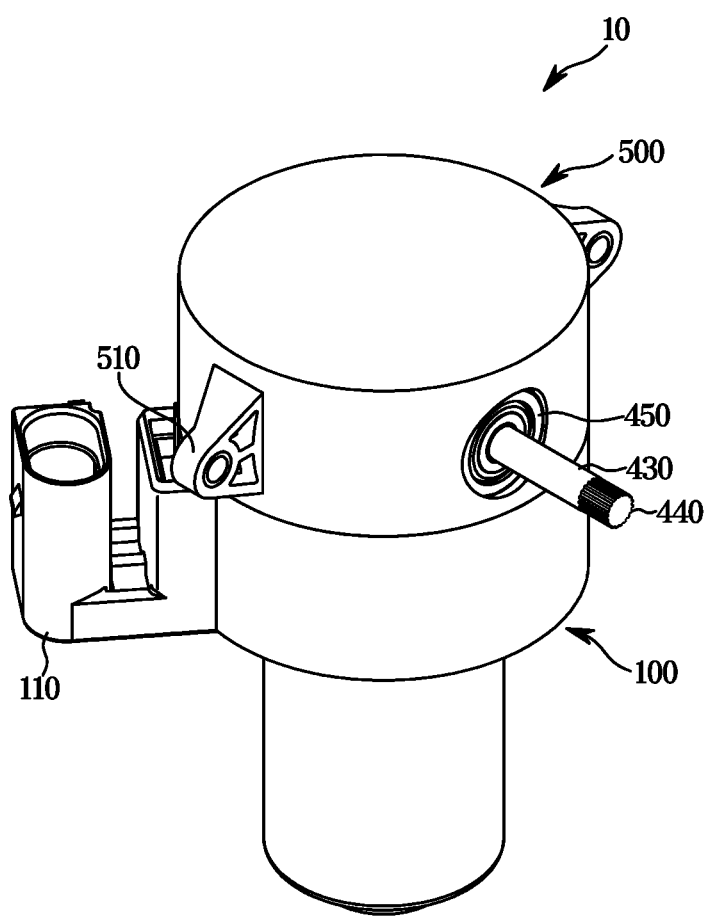

[FIG. 2]
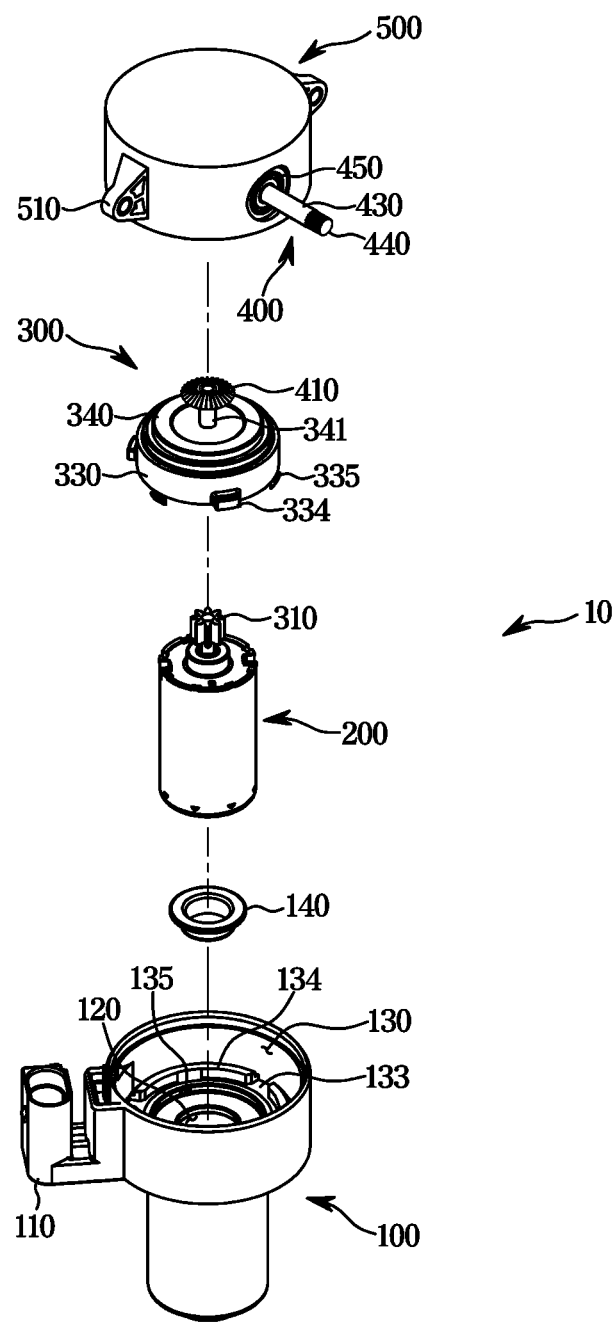

[FIG. 3]
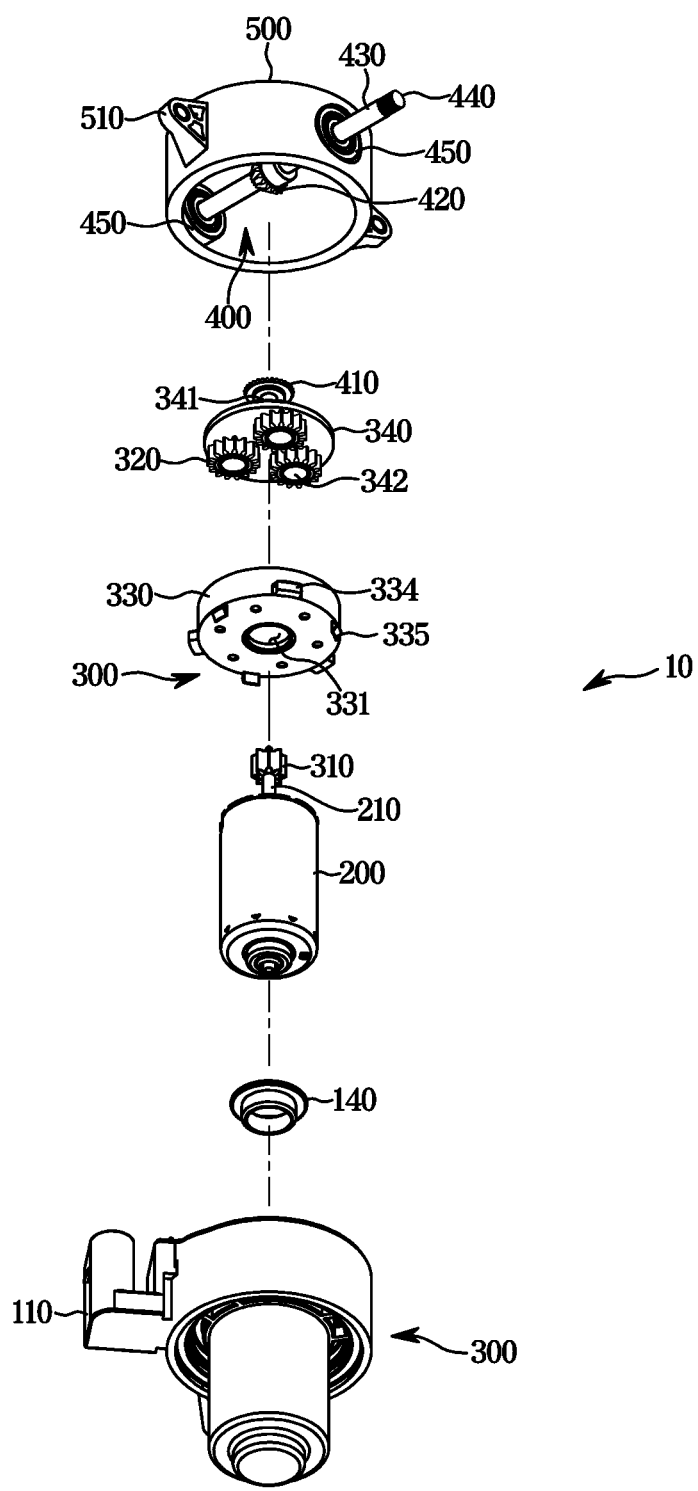

[FIG. 4]
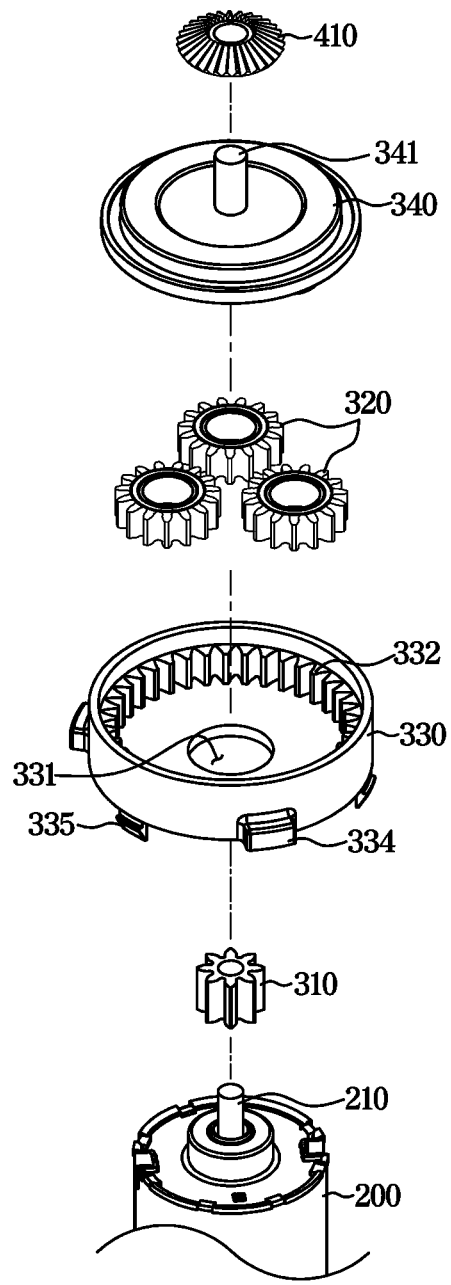

【FIG. 5】
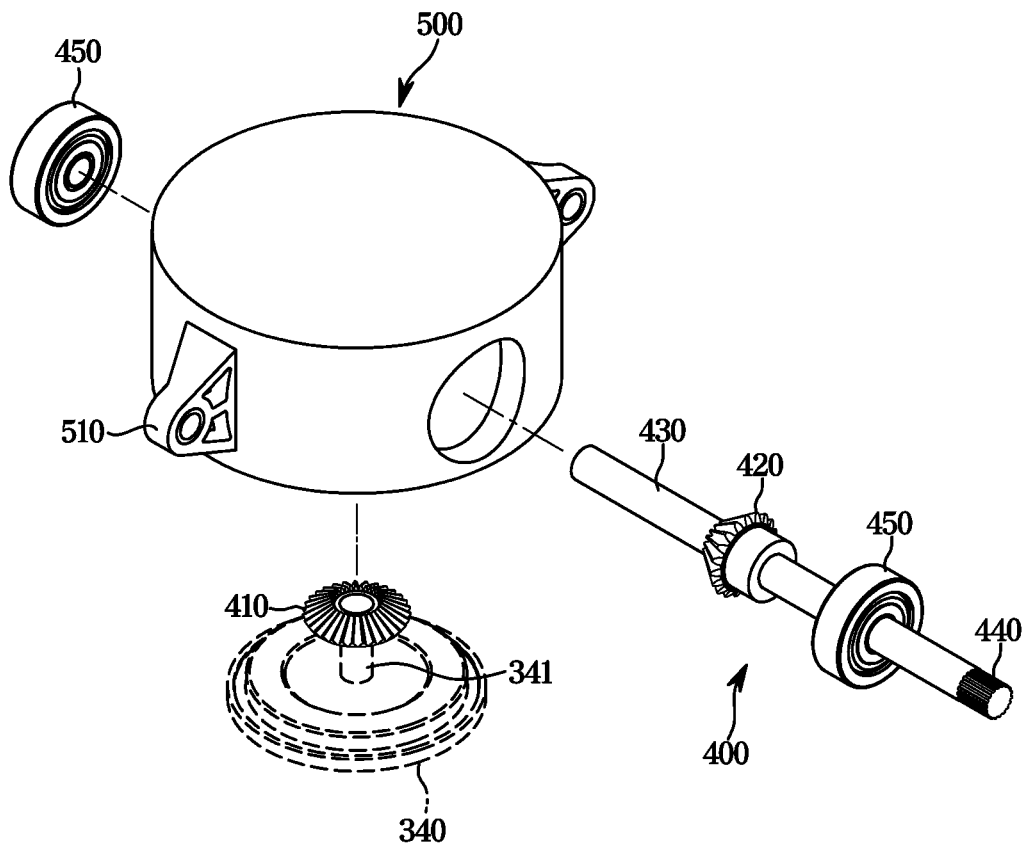
【FIG. 6】
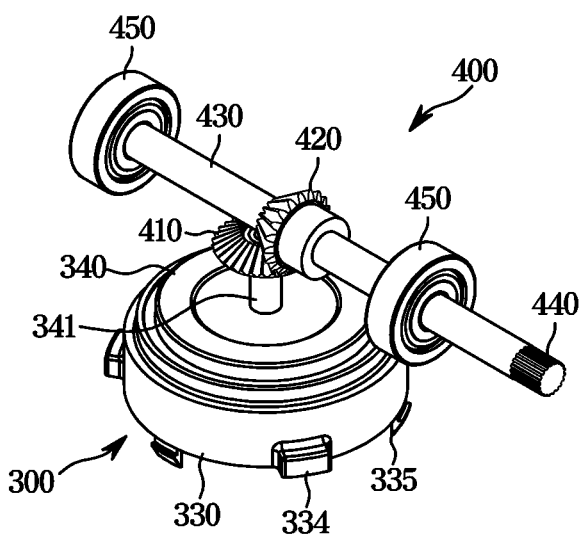

[FIG. 7]
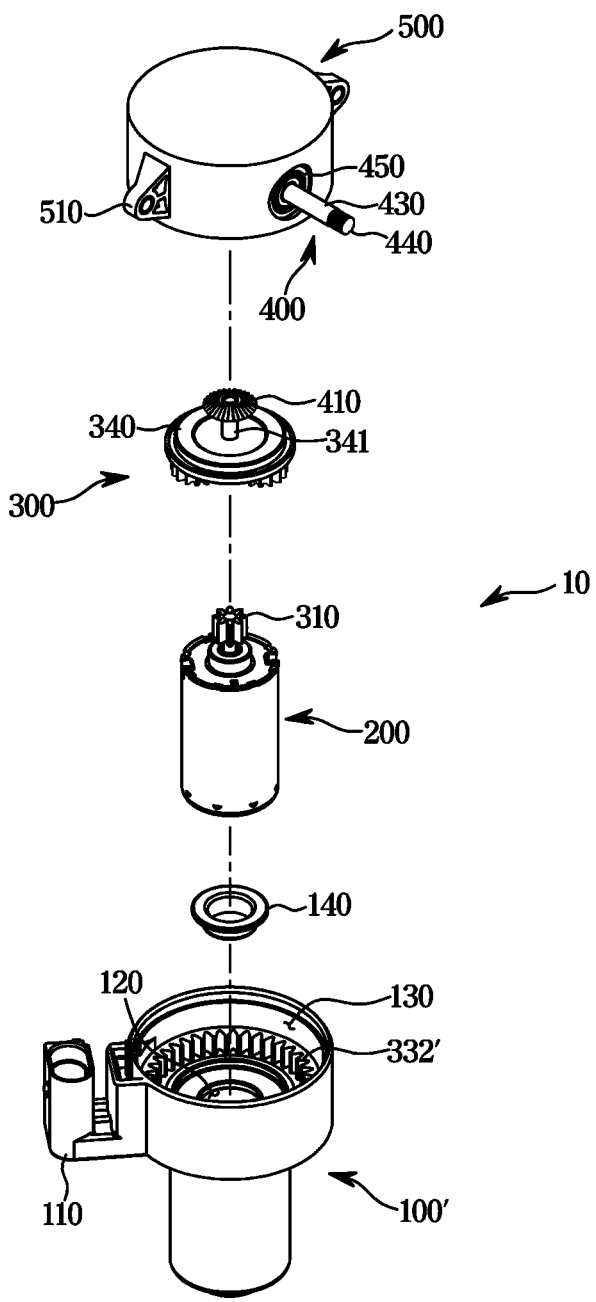

[FIG. 8]
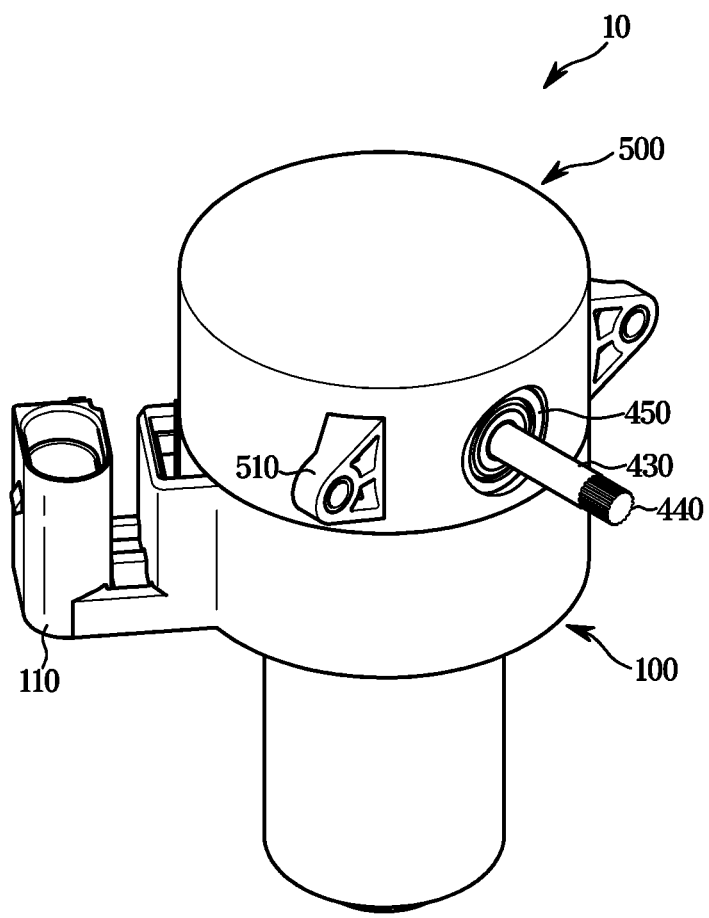

【FIG. 9】
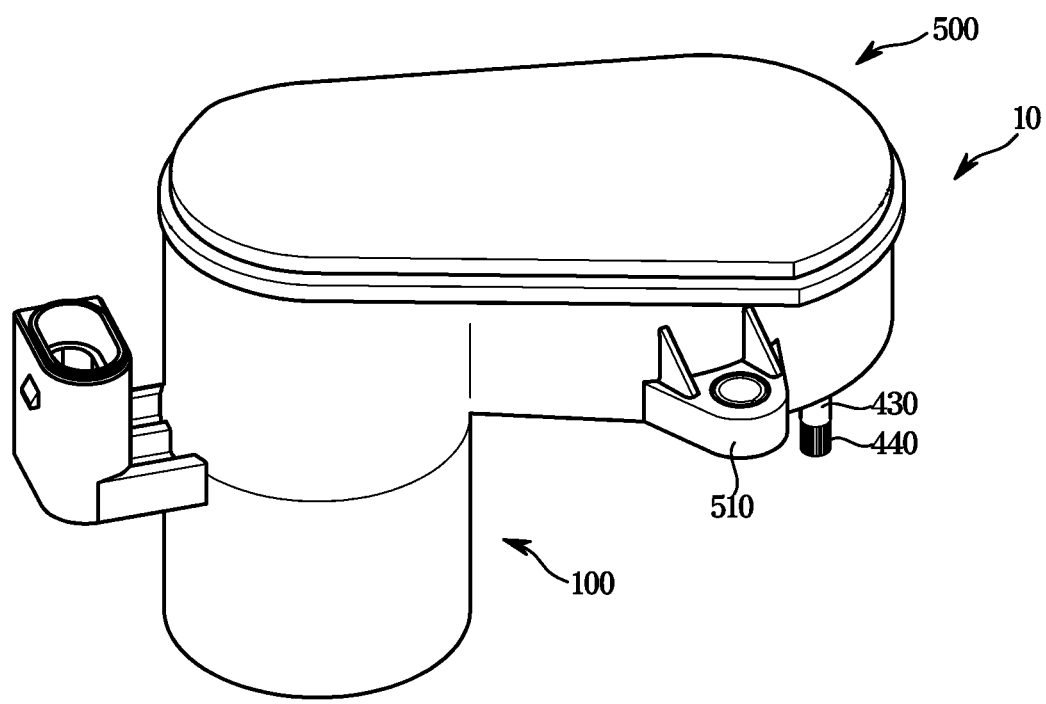

ACTUATOR FOR BRAKE DEVICE

CROSS-REFERENCE OF RELATED APPLICATIONS

This application is the U.S. National Phase under 35 U.S.C. § 371 of International Patent Application No. PCT/KR2020/015241, filed on Nov. 3, 2020, which claims the benefit of Korean Patent Application No. 10-2019-0144019, filed on Nov. 12, 2019, the entire disclosures of each are incorporated by reference herein.

TECHNICAL FIELD

The present disclosure relates to an actuator for a brake device, and more particularly, to an actuator for a brake device capable of realizing a parking function by operation of a motor.

BACKGROUND ART

Generally, a brake device is a device for stopping a vehicle from moving during braking or parking, and serves to prevent a wheel of the vehicle from rotating.

Recently, an Electric Parking Brake (EPB) system for electronically controlling driving of a parking brake has been widely used, and the EPB is mounted on a conventional disc brake to perform function of the parking brake. The disk brakes include a cable puller type, a motor-on-caliper (MOC) type, and a hydraulic parking brake type.

For example, documents disclosed in Korean Patent Publication No. 10-2011-0072877 (Jun. 29, 2011) and Korean Patent Publication No. 10-2018-0133976 (Dec. 18, 2018) relate to a structure of a MOC-type EPB actuator. These EPB actuator disclosed an actuator used in an electronic disc brake that decelerates power generated from a motor while increasing torque by using a plurality of gear devices and transmits the power to a caliper for a parking brake to perform a braking operation.

Actuators used in such electronic disc brakes generate large vibrations and noises, and inferior in terms of assembly and price competitiveness.

Furthermore, Actuators used in such electronic disc brakes take a disadvantage in that the structure between gears for transmitting a rotational force is complicated, and heat loss and durability performance due to friction decrease as the number of connecting parts of the gear increases.

DISCLOSURE

Technical Problem

An aspect of the disclosure is to provide an actuator for a brake device capable of packaging a planetary gear and a bevel gear connected to a motor to have a simple structure and miniaturization, thereby reducing weight and increasing efficiency.

Technical Solution

In accordance with an aspect of the present disclosure, an actuator for a brake device includes a motor; a first reduction gear unit connected to the motor; and a second reduction gear unit connected to the first reduction gear unit; wherein the first reduction gear unit is provided as a planetary gear assembly, and the second reduction gear unit is provided as a bevel gear assembly.

The actuator may further include a housing having a motor accommodating portion accommodating the motor and a gear accommodating portion accommodating the first reduction gear unit.

The actuator may further include a bracket that is coupled to an upper side of the gear accommodating portion and on which the second reduction gear unit is installed.

The first reduction gear unit may include a sun gear coupled to a rotation shaft of the motor; a plurality of planetary gears meshed with an outer side of the sun gear; a gear mounting portion provided with a ring gear on an inner circumference thereof to accommodate the plurality of planetary gears; and a carrier that rotatably supports the plurality of planetary gears and is installed to rotate coaxially with the sun gear and is provided with an output shaft for outputting rotational power.

The gear mounting portion may be provided integrally with the gear accommodating portion of the housing.

The gear mounting portion may be detachably coupled to the housing.

The gear accommodating portion may be provided with an extension panel to which the gear mounting portion is coupled, and a hook is provided at an outer lower end of the gear mounting portion to be detachably from the extension panel.

The extension panel may be provided with a plurality of locking ribs spaced apart from each other by a predetermined distance along a circumferential direction thereof, and coupling ribs engaged between the plurality of locking ribs may be formed to protrude from an lower side of the gear mounting portion.

The second reduction gear unit may include a first bevel gear provided on the output shaft of the carrier; and a second bevel gear meshed with the first bevel gear.

The second reduction gear unit may further include a power transmission shaft provided to pass through the second bevel gear and rotate together with the second bevel gear.

An output gear for outputting rotational power may be provided at one end of the power transmission shaft.

The actuator may further include a bearing provided on the power transmission shaft to rotatably support the power transmission shaft.

The bearing may be provided to be supported by a bracket provided to install the second reduction gear unit.

A damper member for supporting a lower end of the motor may be provided at a bottom of the motor accommodating portion.

Advantageous Effects

An embodiment of disclosure may provide an actuator for a brake device capable of packaging in a compact size by using a planetary gear and a bevel gear in the power transmission process of the motor, and reducing a weight thereof.

Furthermore, an embodiment of disclosure may provide an actuator for a brake device having a simple gear connection structure to increase an efficiency and capable of effectively implementing a low-noise operation.

DESCRIPTION OF DRAWINGS

FIG. 1 is a perspective view illustrating an actuator for a brake device according to an embodiment of the disclosure.

FIG. 2 is an exploded perspective view illustrating an actuator for a brake device according to an embodiment of the disclosure.

FIG. 3 is an exploded perspective view illustrating a lower side of FIG. 2.

FIG. 4 is an exploded perspective view illustrating a coupling state between a motor and a first reduction gear unit of an actuator for a brake device according to an embodiment of the disclosure.

FIG. 5 is an exploded perspective view illustrating a coupling state between a bracket and a second reduction gear unit of an actuator for a brake device according to an embodiment of the disclosure.

FIG. 6 is a partially perspective view illustrating a coupling state of a first reduction gear unit and a second reduction gear unit of an actuator for a brake device according to an embodiment of the disclosure.

FIG. 7 is a view illustrating a housing of an actuator for a brake device according to another embodiment of the disclosure.

FIG. 8 is a view illustrating an actuator for a brake device according to another embodiment of the disclosure.

FIG. 9 is a view illustrating an actuator for a brake device according to another embodiment of the disclosure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a perspective view illustrating an actuator for a brake device according to an embodiment of the disclosure, FIG. 2 is an exploded perspective view illustrating an actuator for a brake device according to an embodiment of the disclosure, FIG. 3 is an exploded perspective view illustrating a lower side of FIG. 2, FIG. 4 is an exploded perspective view illustrating a coupling state between a motor and a first reduction gear unit of an actuator for a brake device according to an embodiment of the disclosure, FIG. 5 is an exploded perspective view illustrating a coupling state between a bracket and a second reduction gear unit of an actuator for a brake device according to an embodiment of the disclosure, and FIG. 6 is a partially perspective view illustrating a coupling state of a first reduction gear unit and a second reduction gear unit of an actuator for a brake device according to an embodiment of the disclosure.

Referring to FIGS. 1 to 6, an actuator 10 for a brake device according to an embodiment of the disclosure includes a motor 200, a first reduction gear unit 300 connected to the motor 200, a second reduction gear unit 400 connected to the first reduction gear unit 300, and a housing 100 accommodating the motor 200 and the first reduction gear unit 300. Furthermore, the actuator 10 for a brake device according to an embodiment of the disclosure further includes a bracket 500 coupled to the housing 100 and on which the second reduction gear unit 400 is installed.

The housing 100 includes a motor accommodating portion 120 accommodating the motor 200, and a gear accommodating portion 130 accommodating the first reduction gear unit 300. The gear accommodating portion 130 is located on an upper side of the motor accommodating portion 120, and an upper part of the gear accommodating portion 130 is provided in an open form. The open upper part of the housing 100 may be closed by the bracket 500 to be described later.

The motor accommodating portion 120 has a depth capable of accommodating the motor 200, and may have a cylindrical shape with an open upper part thereof. Accordingly, the motor 200 may be inserted and mounted through the open upper part of the motor accommodating portion 120.

Meanwhile, a damper member 140 capable of absorbing vibration while supporting a lower end of the motor 200 may be installed on a bottom of the motor accommodating portion 120, thereby reducing noise caused by vibration by the damper member 140.

The gear accommodating portion 130 is provided integrally with the open upper part of the motor accommodating portion 120. The first reduction gear unit 300 is accommodated in the gear accommodating portion 130, and an extension panel 123 coupled to the gear mounting portion 330 of the first reduction gear unit 300 to be described later may be formed on the gear accommodating portion 130. The gear accommodating portion 130 may be provided in a vertically open form in order to output a rotational force reduced through the first reduction gear unit 300. A structure in which the gear mounting portion 330 is coupled to the extension panel 123 will be described again below.

The bracket 500 is provided in the form of a box with an open lower side, and forms a space therein while being coupled to the housing 100. The bracket 500 and the housing 100 may be made of a synthetic resin material, and after the motor 200, the first reduction gear unit 300, and the second reduction gear unit 400 are fixedly installed in the housing 100 and the bracket 500, the housing 100 and the bracket 500 may be bonding by ultrasonic or laser welding. Accordingly, an inside of the housing 100 may be easily sealed.

On the other hand, a connector portion 110 for supplying power to the motor 200 is formed in the housing 100, and when the motor 200 is installed in the housing 100, a power terminal (not shown) of the motor 200 may be provided to be connected to a terminal of the connector portion 110.

The first reduction gear unit 300 transmits the rotational force of the motor 200 by directly connecting the motor 200 and the second reduction gear unit 400. The first reduction gear unit 300 may be provided as a planetary gear assembly.

More specifically, the first reduction gear unit 300 includes a sun gear 310 coupled to a rotation shaft 210 of the motor 200, a plurality of planetary gears 320 meshed with an outer side of the sun gear 310, the gear mounting portion 330 provided with a ring gear 332 on an inner circumferential to accommodate the plurality of planetary gears 320, and a carrier 340 that rotatably supports the plurality of planetary gears 320 and installed to rotate coaxially with the sun gear 310.

The plurality of planetary gears 320 are provided in three and arranged to surround the sun gear 310. At this time, the three planetary gears 320 are provided in consideration of efficiency and economic feasibility, but four planetary gears may be optionally provided and used. The plurality of planetary gears 320 are rotatably coupled to a planetary gear shaft portion 342 formed on the carrier 340.

The gear mounting portion 330 is provided with a shaft hole 331 penetrating vertically in a center thereof, and the ring gear 332 is provided along an inner side circumferential direction of the gear mounting portion 330. The ring gear 332 may be manufactured integrally with the gear mounting portion 330. Accordingly, when the gear mounting portion 330 is mounted on the gear accommodating portion 130, the sun gear 310 is disposed in an inner space of the gear mounting portion 330 provided with the ring gear 332.

The gear mounting portion 330 is provided in a hollow cylindrical shape with an open upper side and may be detachably coupled to the extension panel 123 formed in the gear accommodating portion 130. A hook 335 may be provided at an outer lower end of the gear mounting portion 330 to be detachably from the extension panel 123.

Furthermore, to stably couple the gear mounting portion 330 to the extension panel 123, the extension panel 123 may be provided with a plurality of locking ribs 124 spaced apart from each other by a predetermined distance along an circumferential direction thereof, and coupling ribs 334 engaged between the plurality of locking ribs 124 may be formed to protrude from an lower outer circumferential surface of the gear mounting portion 330.

When the gear mounting portion 330 is mounted on the extension panel 123, the hook 335 is inserted into a hook groove 125 formed in the extension panel 123 to be bound, and as a result, the plurality of locking ribs 124 and the coupling ribs 334 are mutually constrained, so that rotation and separation of the gear mounting portion 330 are restricted.

On the other hand, although the gear mounting portion 330 has been illustrated and described as being detachably provided on the extension panel 123, it is not limited thereto. For example, the gear mounting portion 330 may be integrally formed with the housing 100' so that the ring gear 332' is provided in the gear accommodation portion 130, which embodiment is illustrated in FIG. 7. FIG. 7 shows another embodiment of the disclosure, the same reference numerals as in the drawings shown above refer to members having the same function. In other words, the actuator for the brake device shown in FIG. 7 differs from the described above embodiment only in that the ring gear 332' of the gear mounting portion is provided integrally with the housing 100', but the remaining of the configuration is the same, so a detailed description thereof will be omitted.

Referring back to FIGS. 1 to 6, the carrier 340 may be formed in a disk shape, and the plurality of planetary gear shaft portions 342 spaced apart from each other in the circumferential direction are provided on the lower surface thereof, and an output shaft 341 is provided in a center of the upper surface thereof. At this time, the output shaft 341 may be formed integrally with the carrier 340 to rotate together.

The second reduction gear unit 400 may be provided to be supported by the bracket 500 so as to be connected to the first reduction gear unit 300. The second reduction gear unit 400 may be provided as a bevel gear assembly.

More specifically, the second reduction gear unit 400 may include a first bevel gear 410 provided on the output shaft 341 of the carrier 340, a second bevel gear 420 meshed with the first bevel gear 410, and a power transmission shaft 430 installed through the second bevel gear 420.

The first bevel gear 410 is provided in a conical shape and is coupled to rotate coaxially with the output shaft 341 of the carrier 340. Accordingly, the first bevel gear 410 rotates in the same rotational direction as the carrier 340 and transmits the rotational force to the second bevel gear 420.

The second bevel gear 420 rotates while meshing with the first bevel gear 410, and rotates while changing the rotation direction to a direction perpendicular to the rotation shaft 210 of the motor 200. The change of the rotation direction using the bevel gears 410 and 420 has a better contact ratio than that of the spur gear, so noise may be significantly reduced, and also the gear ratio may be adjusted to perform an efficient deceleration function.

The power transmission shaft 430 passes through the second bevel gear 420 so that the second bevel gear 420 maintains a meshing state with the first bevel gear 410 to rotate together with the second bevel gear 420. The power transmission shaft 430 has a predetermined length, and an output gear 440 for outputting rotational power is provided at one end thereof. Accordingly, the one end at which the output gear 440 of the power transmission shaft 430 is formed may be disposed to be exposed to outside from the bracket 500.

A bearing 450 is provided on the power transmission shaft 430 so that the power transmission shaft 430 rotates stably. The bearings 450 are provided as a pair and installed on the bracket 500. One of the bearing 450 is provided at the other end of the power transmission shaft 430, and the other of the bearing 450 may be provided between the second bevel gear 420 and the output gear 440 to rotatably support the power transmission shaft 430.

On the other hand, the output gear 440 may be provided with gear teeth formed on one end of an outer surface of the power transmission shaft 430. Accordingly, the output gear 440 outputs rotational power while rotating in the same rotational direction as the power transmission shaft 430. For example, the output gear 440 may be provided to transmit the rotational power to an electric parking brake device.

The actuator 10 for the brake device as described above may be coupled to a caliper through a mounting portion 510 provided on an outer side of the bracket 500 in order to transmit power to a caliper for a parking brake (not shown). The mounting portion 510 is a portion coupled to the caliper for the parking brake, and may be formed on an outer side of the housing 100 as well as the bracket 500. Furthermore, the shape or number of the mounting portions 510 may be varied according to a mounting position at which the actuator 10 for brake device is installed to transmit power to the caliper. FIG. 8 shows the actuator 10 for the brake device having the mounting portion 510 whose position is changed for coupling with the caliper. FIG. 8 is a view illustrating another embodiment of the disclosure, and the same reference numerals as in the described above embodiment refer to members having the same function.

Referring to FIG. 8, the mounting portion 510 may be formed on a distal end side of the bracket 500 in a direction in which the output gear 440 is positioned to be closely coupled to the caliper. In other words, the position at which the mounting portion 510 is formed is changed for coupling with the caliper, so that ease of installation may be secured.

On the other hand, in embodiments of the disclosure, the first reduction gear unit 300 receiving the rotational force from the motor 200 is provided as a planetary gear assembly, and the second reduction gear unit 400 connected to the first reduction gear unit 300 is provided as a bevel gear assembly, so that the structure has been illustrated and described as transmitting power in a so-called L-shape, but is not limited thereto. For example, the first reduction gear unit 300 is provided as a bevel gear assembly, and the second reduction gear unit 400 is provided as a planetary gear assembly, so that the power may be transmitted to the caliper. As shown in FIG. 9, the power may be transmitted in a so-called C-shape structure by changing the position and structure in which the bevel gear assembly and the planetary gear assembly are assembled as described above. FIG. 9 is a view illustrating another embodiment of the disclosure, and the same reference numerals as in the described above embodiment refer to members having the same function.

Referring to FIG. 9, the actuator 10 for the brake device according to the embodiment of the disclosure may be provided to transmit power in a C-shape structure by changing the assembly structure between the reduction gears of the described above embodiment. For example, although not shown, the bevel gear is assembled on the rotation shaft of the motor and the rotational force of the motor transmits the sun gear of the planetary gear assembly through the power transmission shaft and the plurality of other bevel gears, so that directionality of the output rotational power (meaning to a direction of the output shaft that is finally output) may be changed. In other words, the actuator 10 for the brake device according to an embodiment of the disclosure may change the assembling method of the planetary gear assembly and the bevel gear assembly in various forms to transmit power, and then adjust directionality of the rotational power finally output.

Hereinafter, the operation of the actuator for the brake device according to an embodiment of the disclosure will be described.

When a driver operates the parking brake after stopping the vehicle, the motor 200 is driven to rotate the rotating shaft 210 of the motor 200. Accordingly, the sun gear 310 coupled to the rotation shaft 210 of the motor 200 rotates together and transmits the rotational force to the plurality of planetary gears 320 meshed with the sun gear 310. The plurality of planetary gears 320 revolve and rotate along the circumference of the sun gear 310 and along the ring gear 332 provided along the circumference of the inner surface of the gear mounting portion 330. As the carrier 340 rotates in the coaxial direction with the rotation shaft 310 of the motor 200 by the plurality of planetary gears 320 revolving, the output shaft 341 rotates together.

When the carrier 340 rotates, the first bevel gear 410 coupled to the output shaft 341 rotates together with the carrier 340 and transmits the rotational force to the second bevel gear 420, and the power transmission shaft 430 installed through the second bevel gear 420 rotates together with the second bevel gear 420. Accordingly, the output gear 440 provided at the one end of the power transmission shaft 430 rotates together with the power transmission shaft 430 to output the rotational power.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An actuator for a brake device, comprising:
a motor;
a first reduction gear unit connected to the motor; and
a second reduction gear unit connected to the first reduction gear unit;
wherein the first reduction gear unit is provided as a planetary gear assembly, and the second reduction gear unit is provided as a bevel gear assembly,
further comprising a housing having a motor accommodating portion accommodating the motor and a gear accommodating portion accommodating the first reduction gear unit,
further comprising a bracket that is coupled to an upper side of the gear accommodating portion and on which the second reduction gear unit is installed,
further comprising the gear accommodating portion is located on an upper side of the motor accommodating portion, and an upper part of the gear accommodating portion is provided in an open form, and the open upper part of the housing may be closed by the bracket.

2. The actuator of claim 1, wherein the first reduction gear unit comprises:
a sun gear coupled to a rotation shaft of the motor;
a plurality of planetary gears meshed with an outer side of the sun gear;
a gear mounting portion provided with a ring gear on an inner circumference thereof to accommodate the plurality of planetary gears; and
a carrier that rotatably supports the plurality of planetary gears and is installed to rotate coaxially with the sun gear and is provided with an output shaft for outputting rotational power.

3. The actuator of claim 2, wherein the gear mounting portion is provided integrally with the gear accommodating portion of the housing.

4. The actuator of claim 2, wherein the gear mounting portion is detachably coupled to the housing.

5. The actuator of claim 4, wherein the gear accommodating portion is provided with an extension panel to which the gear mounting portion is coupled, and
a hook is provided at an outer lower end of the gear mounting portion to be detachably from the extension panel.

6. The actuator of claim 5, wherein the extension panel is provided with a plurality of locking ribs spaced apart from each other by a predetermined distance along a circumferential direction thereof, and coupling ribs engaged between the plurality of locking ribs are formed to protrude from an lower side of the gear mounting portion.

7. The actuator of claim 2, wherein the second reduction gear unit comprises:
a first bevel gear provided on the output shaft of the carrier; and
a second bevel gear meshed with the first bevel gear.

8. The actuator of claim 7, wherein the second reduction gear unit further comprises a power transmission shaft provided to pass through the second bevel gear and rotate together with the second bevel gear.

9. The actuator of claim 8, wherein an output gear for outputting rotational power is provided at one end of the power transmission shaft.

10. The actuator of claim 8, further comprising a bearing provided on the power transmission shaft to rotatably support the power transmission shaft.

11. The actuator of claim 10, wherein the bearing is provided to be supported by a bracket provided to install the second reduction gear unit.

12. The actuator of claim 1, wherein a damper member for supporting a lower end of the motor is provided at a bottom of the motor accommodating portion.

* * * * *